May 30, 1967  R. T. BURNETT  3,322,236
BRAKE
Original Filed May 7, 1962  4 Sheets-Sheet 1
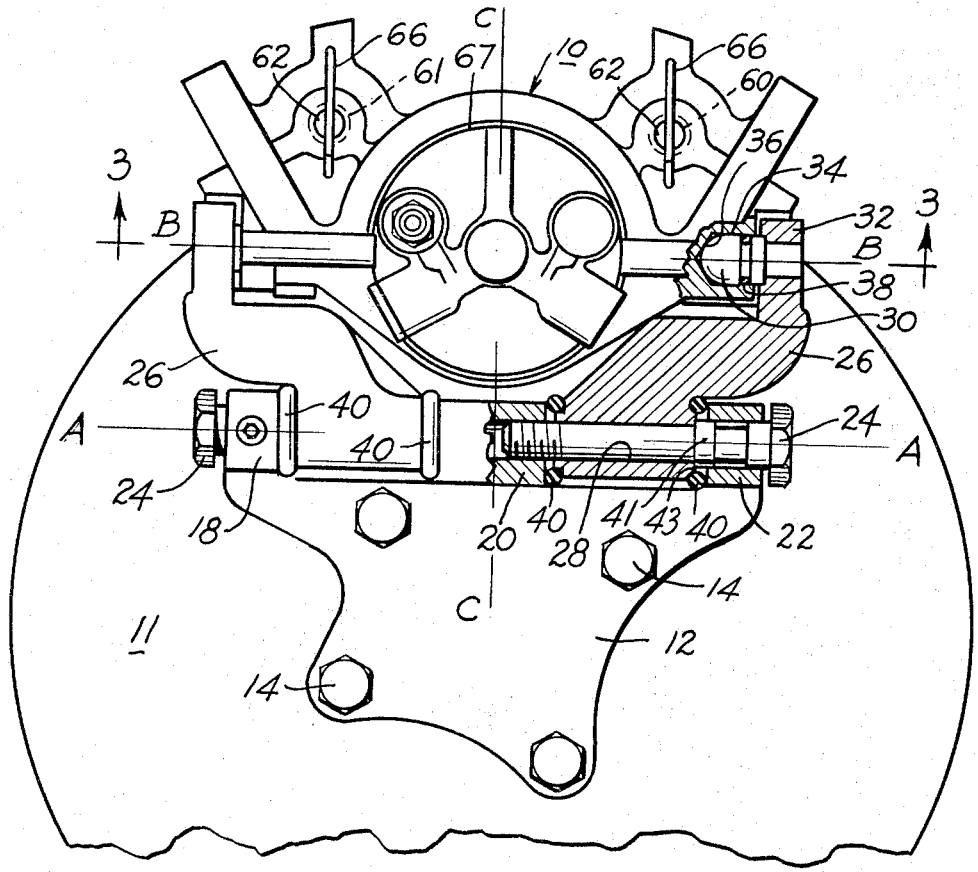
FIG_1
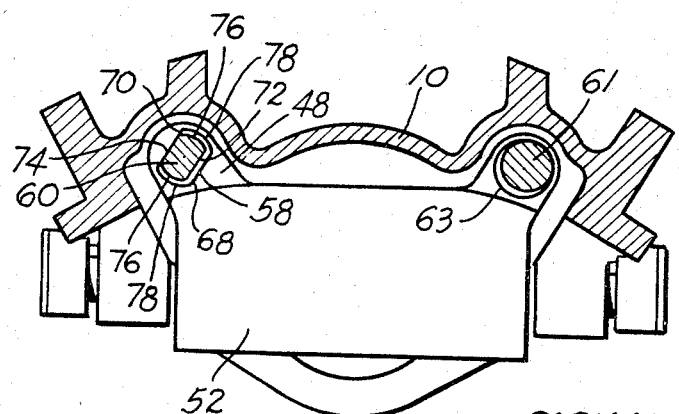
FIG_6
INVENTOR.
RICHARD T. BURNETT.
BY
*Gordon N. Chavez*
AGENT.

INVENTOR.
RICHARD T. BURNETT.
BY
*Gordon H. Chesney*
AGENT

May 30, 1967  R. T. BURNETT  3,322,236
BRAKE
Original Filed May 7, 1962  4 Sheets-Sheet 3
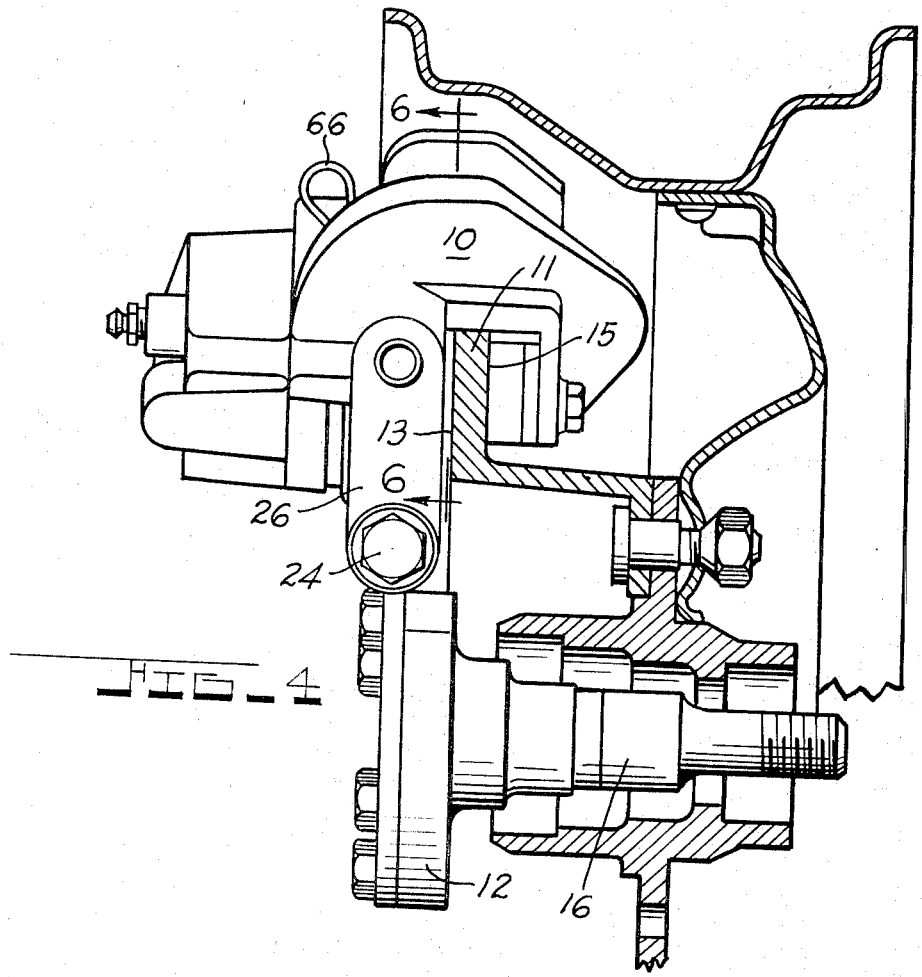
FIG_4
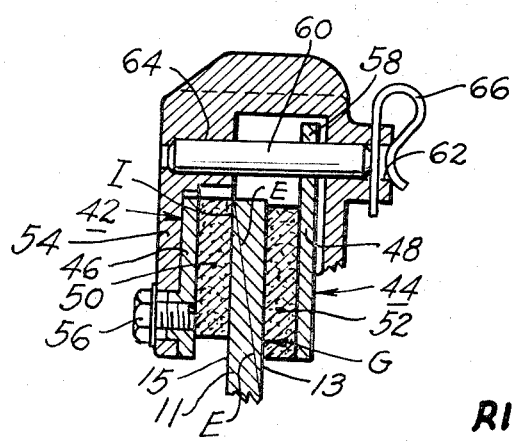
FIG_5
INVENTOR.
RICHARD T. BURNETT.
BY
*Gordon H. Cheney*
AGENT

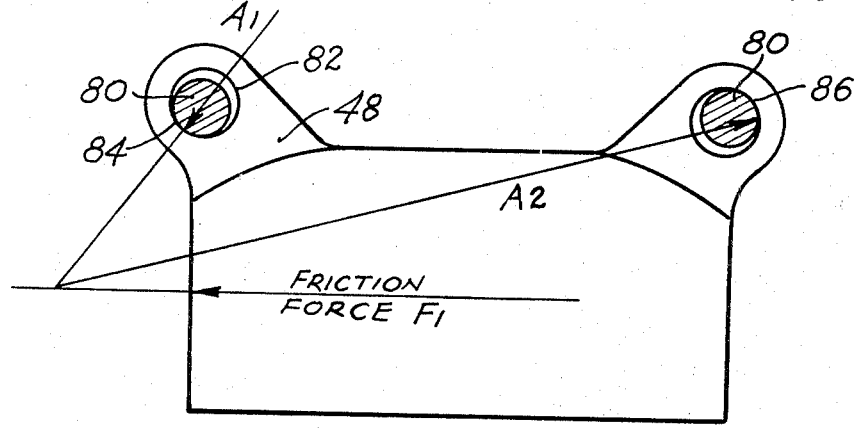
FIG_7
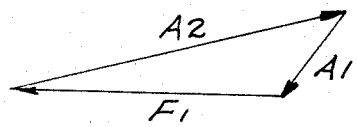
$A_2 = 1.32 F_1$
$A_1 = .44 F_1$
FIG_8
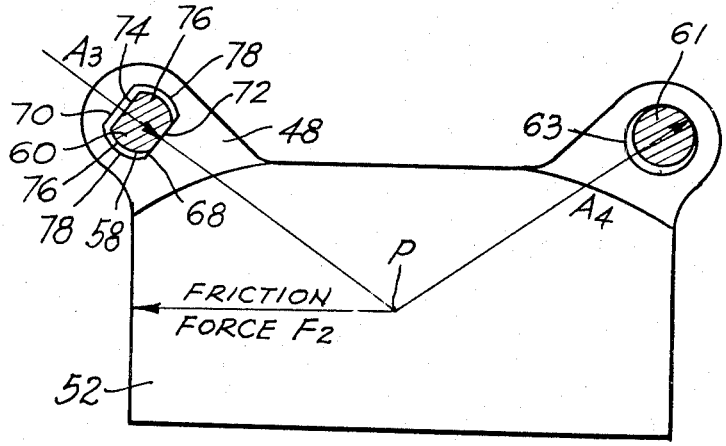
FIG_9
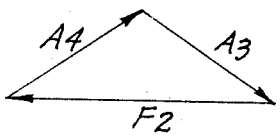
$A_1 = A_2 = APPROX .6 F$
FIG_10
INVENTOR.
RICHARD T. BURNETT.
BY
Gordon H. Cheney
AGENT 3,322,236
BRAKE
Richard T. Burnett, South Bend, Ind., assignor to The Bendix Corporation, a corporation of Delaware
Original application May 7, 1962, Ser. No. 192,857, now Patent No. 3,268,034, dated Aug. 23, 1966. Divided and this application Apr. 18, 1966, Ser. No. 543,383
14 Claims. (Cl. 188—73)

This application is a division of application Serial No. 192,857 filed May 7, 1962, now Patent No. 3,268,034.

This invention relates to a disk brake and more particularly to a brake of the caliper type wherein the caliper is mounted on its support member in such a way that friction members carried by said caliper are able to fully engage the rotor of the brake.

One of the disadvantages of many disk brakes is the brake shoes or friction members of the disk brake are not able to properly align themselves with the friction surface of the brake rotor resulting in uneven wear of the brake shoes, dragging, and twisting strain on the caliper, the support, and the connection between the caliper and support. To prevent as much as possible of the above disadvantage, tolerances must be carefully watched and the brake must be carefully aligned when mounted on a vehicle; therefore resulting in an added expense which is substantial when considered with the total cost.

An object of this invention is to provide a brake which permits optimum alignment between friction members and a brake rotor.

One of the objects of the invention is to provide a disk brake which dispenses with many of the tolerances of manufacture heretofore necessary and which can be mounted to a vehicle with a decrease in many aligning problems previously encountered.

Another object of the invention is to provide a caliper disk brake wherein a housing is swivelably mounted to its support member.

Still another object of the invention is to provide a caliper disk brake wherein a housing is swivelably mounted to two links wherein each link is pivotally mounted to a support member.

A further object of the invention is to provide a brake wherein two pins support a brake shoe and take equal reaction force upon actuation of the brake.

An overall object of this invention is to provide a caliper brake, which is simple in construction and economical to manufacture, including means for allowing full engagement of the brake shoe of friction members with the friction surface of the rotor and still maintain efficient braking.

A full understanding of the invention may be had from the following detailed description with reference to the accompanying drawings, wherein:

FIGURE 1 is an elevational front view of the caliper brake partially cut away to illustrate a feature of the invention;

FIGURE 4 is a side elevational view of FIGURE 1;

FIGURE 5 is a view taken along section line 5—5 of FIGURE 2;

FIGURE 6 is a view taken along section line 6—6 of FIGURE 4;

FIGURE 7 is a view of a brake shoe and mounting means therefor of the prior art showing force distribution;

FIGURE 8 is a force diagram of FIGURE 7;

FIGURE 9 is a view of a brake shoe and the mounting means therefor of the present invention showing force distribution; and FIGURE 10 is a force diagram of FIGURE 9.

Figure 2:
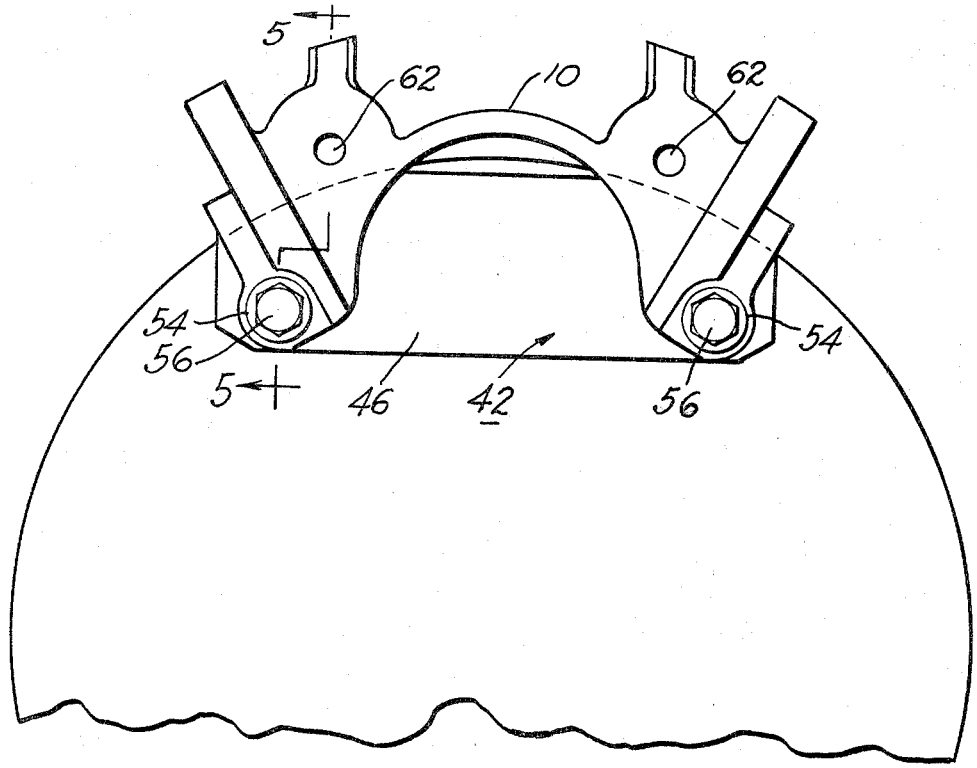
FIGURE 2 is a rear elevational view of the caliper brake.
Figure 3:
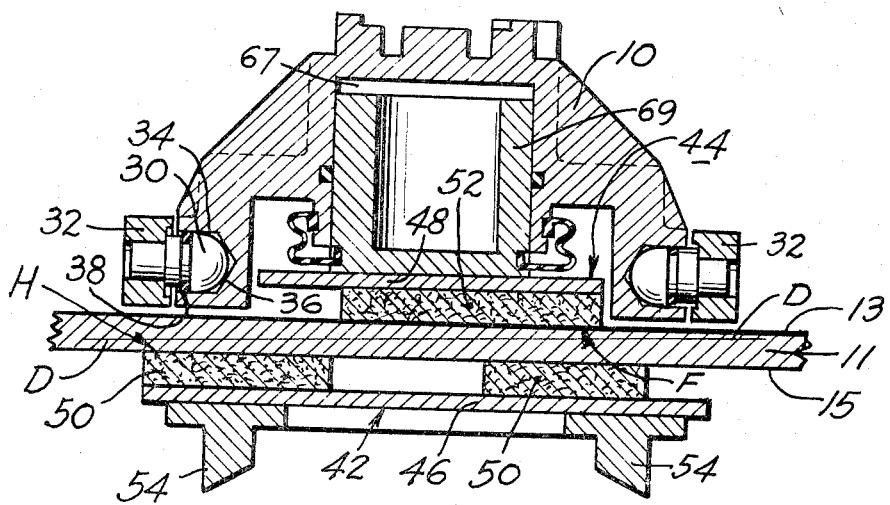
FIGURE 3 is a view taken along section line 3—3 of FIGURE 1.

Referring to FIGURES 1 through 5, a caliper housing 10 is mounted on a support bracket 12 which is in turn mounted by bolts 14 to a stationary part of the vehicle which may be, for example, a spindle 16. The caliper housing 10 straddles a rotor 11 having friction faces 13 and 15 thereon. The support bracket 12 has formed integrally therewith, ears 18, 20 and 22, each of which has aligned openings therein for receiving bolts 24. Links 26 each have an opening 28 at one end thereof for receiving the bolt 24 and are pivotally mounted on the bolt 24 to the bracket 12 for pivotal movement about an axis A—A. Each link 26 has force fitted therewith a bearing member 30, shaped as a sector of a sphere, extending from the other end 32. The housing 10 has an opening 34 at each of its circumferentially spaced ends for receiving the bearing member 30. Each opening 34 has surfaces 36 which bear on the spherical portion of the bearing member 30 for swivelable movement thereon. It should be understood that the bearing members could be carried by the housing and the links 26 could have complementary openings therein. Thus, it can be seen that the housing 10 can pivot about the axis A—A and axis B—B and since each link 26 can pivot about the axis A—A independently of each other and the housing 10 is swivelable on the bearing member 30, the housing 10 can pivot about an axis C—C.

To avoid having a great deal of friction in pivotable movement between the links 26 and bolts 24 and between the surfaces 36 and bearing member 30, the frictional connections should be thoroughly lubricated at all times and be protected from contaminants. Therefore, an O-ring 38 is placed in a groove of the bearing member 30 and O-rings 40 are placed between the ears of the support bracket 12 and each link 26 to prevent loss of lubricant and to prevent contaminants from collecting in the connections.

To prevent rattling of the housing on the support member, the links 26 are adjustable axially along the axis A—A to provide for a snug fit thereby allowing the links 26 to freely rotate on the support bracket 12 and the housing 10 to freely swivel on the bearing members 30. Each bolt 24 has an annular flange 41 which abuts an end shoulder 43 of each link 26. Adjustment of the links 26 is effected by the engagement of the flange 41 with the shoulder 43 during rotation of the bolt 24.

A pair of brake shoes 42 and 44 are carried by the housing 10 and are disposed on each side of the rotor for engagement therewith. The brake shoes 42 and 44 comprise a backing plate 46 and 48, respectively, and friction linings 50 and 52 attached to their respective backing plates. The brake shoe 42 is rigidly connected to legs 54 of the housing 10 by bolts 56 and the backing plate 48 of brake shoe 44 has two openings 58 and 63 therein. Rods 60 and 61 extend through the openings 62 of the housing 10, the openings 58 and 63 of the backing plate 48 and into openings 64 into legs 54; the rod 60 being rotatably mounted in its opening 58 for purposes to be described hereinafter. A pin 66 is provided to retain each rod from axial movement. The brake shoe 44 is slidably mounted on the rods 60 and 61 and therefore slideable relative to the housing 10.

*Operation*

A chamber 67 of the housing 10 contains a piston 69 for actuating the brake through hydraulic pressure. Upon actuation of the brake, the piston 69 will thrust brake shoe 44 against its respective rotor friction face 13 and then further build up of pressure will result in moving the housing in a generally axial direction, due to the pivoting of links 26 on the support bracket 12, thereby bringing the other brake shoe 42 into engagement with its respective rotor surface 15. Assuming that the face of the rotor is not perpendicular to its axis but is warped slightly and tends to be in a plane designated by a line D—D (FIGURE 3), or line E—E (FIGURE 5), or both, then without applicant's construction the lining 52 would engage the rotor mainly in the vicinity of F and G and the lining 50 would engage the rotor mainly in the vicinity of H and I. Thus, the linings will wear unevenly, utilization of the full lining surface in braking will not be achieved, and a twisting strain will be exerted by the rotor through the friction linings and their backing plates to the housing 10 and its connections to the support plate 12. However, applicant's construction alleviates the above conditions, since the housing can pivot about an axis B—B to allow the housing and friction members to align vertically with the rotor friction faces (therefore plane E—E) and the housing can pivot about axis C—C to align the housing and friction members with the rotor friction faces horizontally (therefore plane D—D) thus providing full re-engagement of the brake linings 44 and 46 with their respective rotor friction faces.

*Brake shoe support rod and shoe backing plate*

With reference to FIGURE 6, the particular shapes of the rod 60 and the openings 58 are illustrated. It can be seen that the opening 58 of the backing plate 48 has two parallel edges 68 and 70 and the rod 60 has two parallel parallel faces 72 and 74 extending longitudinally thereof which are complementary to the edges 68 and 70 of the opening 58 of the backing plate 48. The faces 72 and 74 are connected by longitudinal arcuate faces 76 and the edges 70 and 68 are connected by arcuate edges 78. The faces 76 and edges 78 are spaced far enough from each other so they will not engage each other during brake application.

With relation to FIGURE 7, there is illustrated an embodiment of the prior art wherein the brake shoe with openings 82, is attached to two round rods 80. The fit between the rods 80 and openings 82 illustrates exaggerated tolerances. No matter how closely the tolerances are kept, a perfect fit between a round rod and a round opening is almost unattainable. The value of the force exerted on each rod is determined by the point of contact between the edges of the openings 82 and the rods 80 for anchoring thereagainst. Because a perfect match between the round openings 82 and round rods 80 are almost unobtainable, the brake shoes may anchor at different areas on the rods for different sets of brakes and therefore, one is not certain how much force each rod 80 will be forced to take on an application of the brake; resulting in over-design of the rods 82 or if the rods are underdesigned, bending or failure of the rods will result. Assuming that the rotor is rotating in a counterclockwise direction the edge of the openings 82 could possibly abut against the rods 80 at 84 and at 86 with the resultant forces meeting at a point outside the boundary of the backing plate 48.

FIGURE 8 illustrates a force diagram of the force distribution of FIGURE 7 and it is shown that the force $A_1$ exerted on one of the rods 80 is equal to .44 of the resultant force $F_1$ and the reaction force $A_2$ exerted on the other of the rods is equal to 1.32 of the resultant force $F_1$, which is approximately three times the amount of force exerted on the other rod. While this is illustrative of one example of a nonperfect match between the rods and their respective openings, the value of force exerted on each set of rods in different brakes will vary depending on the nonperfect fits.

With reference to FIGURE 9, there is illustrated applicant's construction exaggerating tolerances, and how the forces are distributed to each rod 60 and 61. Assuming that the rotor 11 is moving in a counterclockwise direction, then upon engagement of the friction pad 52 with the rotor, the brake shoe 44 will tend to move toward the left with the reaction being taken by the rods 60 and 61. The edge 68 of the opening 58 and the face 72 of the rod will always fully engage each other upon counterclockwise rotation of the rotor since the rod 60 is free to rotate. The resultant reaction exerted by the rod 60 will therefore be in a line perpendicular to the edge 68. The edges 68 and 70 of the opening 58 are at such an angle on the backing plate that the line of resultant force $A_3$, transmitted by the rod 60 which is generally perpendicular to the edges 68, 70 will pass generally through a point P aligned with the center of pressure exerted by the piston 69 on the brake shoe and through which the resultant frictional force $F_2$, exerted by the rotor on the brake shoe passes. Once the direction of force $A_3$ exerted on rod 60 is determined, the direction of the force $A_4$ exerted on the rod 61 is determined and will pass generally through the aforementioned point that $A_3$ passes through. As shown in FIGURE 10, the force $A_3$ exerted on rod 60 equals the force $A_4$ exerted on rod 61 which each equal approximately .66 of the resultant force $F_2$.

The advantage of this construction, over former constructions, wherein two round rods and two round openings in the backing plate are used is that many close tolerances heretofore required may be dispensed with and equal force on each rod is assured. All that is necessary is that one rod 60 be pivotable and have parallel faces for engaging edges 68 and 70 of opening 58 of the backing plate and that the edges 68 and 70 be at the proper angle wherein the reaction force exerted on the rod 60 will pass generally through a point P aligned with the center of pressure exerted by the piston on the brake shoe and the point wherein the resultant frictional force, exerted by the disk on the shoe, passes. Also, the end edges 76 of the rod 60 and faces 78 of the opening must be spaced from each other to allow for sliding movement of the backing plate 48 relative to the rod 60 so the edge 68 and face 72 will always fully engage each other on counterclockwise rotation of the rotor and edge 70 and face 74 will always fully engage each other on clockwise rotation of the rotor. When these conditions are met, the resultant forces transmitted to the rods are substantially equal to each other at all times during each brake actuation of different sets of brakes.

It will be apparent that the objects heretofore enumerated, as well as others, have been achieved. While the invention has been described in considerable detail, I do not wish to be limited to the particular construction shown and described; and it is my intention to cover hereby all novel adaptations, modifications and arrangements thereof, which come within the process of those skilled in the art to which the invention relates and which come within the scope of the following claims.

I claim:

1. In a disk brake comprising: a rotor; a housing; actuating means; a friction member engageable with said rotor and provided with two circumferentially spaced openings formed therein radially outwardly from the periphery of said rotor; a rod for each opening and extending therethrough radially outwardly from the periphery of said rotor and being connected to said housing; one of said openings and one of said rods defining coacting anchoring surfaces therebetween, at least one of said surfaces being substantially straight and at an angle relative to the resultant frictional force exerted by said rotor on the friction member so that the reaction force exerted by said one rod on said friction member will be inclined to said resultant frictional force when said rotor is rotating in one direction, said one opening being constructed relative to said one rod so that the other of said surfaces may freely contact said straight surface.

2. The structure as recited in claim 1 wherein said straight surface is on said one rod.

3. The structure as recited in claim 1 wherein said straight surface is a portion of the edge of said opening.

4. The structure as recited in claim 1 wherein both of said coacting anchoring surfaces are substantially straight and are inclined at the same angle with respect to said resultant frictional force.

5. The structure as recited in claim 4 wherein said one rod is free to pivot on said housing.

6. The structure as recited in claim 1 wherein said straight surface is at such an angle that the reaction force exerted by said one rod on said friction member will pass generally through a point aligned with the center of pressure exerted on said friction member by said actuating means and through which said resultant frictional force passes.

7. The structure as recited in claim 1 wherein said one opening has a configuration of two generally parallel spaced edges and end edges for connecting said parallel edges, said one rod has longitudinally extending straight generally parallel faces spaced apart substantially the same distance as the straight parallel edges of its respective opening, said one rod further has end faces connecting said parallel faces and being substantially spaced from said end edges to allow free contact between a respective one of said parallel faces and a respective one of said parallel edges, said contacting faces and edges comprising said coacting anchoring surfaces.

8. A disk brake comprising a rotatable disk, a housing straddling said disk, actuating means carried by said housing, a pair of circumferentially spaced abutment means carried by said housing radially outwardly from the periphery of said rotatable disk, a friction member slidably carried by said housing for engagement with said disk, a pair of circumferentially spaced abutment means carried by said friction member for engagement with a respective one of said housing abutment means thereby providing two sets of coacting abutment means, at least one of said abutment means of one of said sets being a substantially straight surface located at an angle relative to the resultant frictional force exerted by said rotor on the friction member so that the reaction force exerted by said housing on said friction member at said one set of coacting abutment means will be inclined to said resultant frictional force when said rotor is rotating in one direction said reaction force being equally distributed between said two sets of coacting abutment means.

9. The structure as recited in claim 8 wherein said straight surface is carried by said friction member.

10. The structure as recited in claim 8 wherein said straight surface is carried by said housing.

11. The structure as recited in claim 8 wherein both of said coacting abutment means of said one set are straight surfaces each inclined at the same angle with respect to said resultant frictional force.

12. The structure as recited in claim 8 wherein said straight surface is at such an angle that the reaction force exerted by said housing on said friction member through said one set of coacting abutment means will pass generally through a point aligned with the center of pressure exerted on said friction member by said actuating means and through which said resultant force passes.

13. In a disk brake comprising: a rotor; a housing; actuating means; a friction member engageable with said rotor and provided with two circumferentially spaced openings formed therein radially outwardly from the periphery of said rotor; a rod for each opening and extending therethrough transversely to and radially outwardly from said rotor and connected at one end to said housing; at least one of said openings having a configuration of two generally parallel spaced edges, said edges being at such an angle on said friction member that reaction force exerted by said rod on said edges will pass generally through a point aligned with the center of pressure exerted on said friction member by said actuating means and through which the resultant frictional force exerted by said rotor on the friction member passes, and edges for connecting said parallel edges; the connection to said housing for the rod for at least one opening being a rotatable one for rotation of the rod relative to the housing; said last mentioned rod having longitudinally extending straight generally parallel faces spaced apart substantially the same distance as the straight parallel edges of its respective opening, said last mentioned rod further having longitudinal faces connecting said parallel faces and being substantially spaced from the edges of said opening connecting the parallel edges to permit relative sliding movement between said last mentioned rod and said one opening, whereby substantially equal force will be applied to each rod upon actuation of the brake.

14. A disk brake comprising a rotatable disk, a nonrotatable caliper straddling a portion of the periphery of the disk, a friction pad located in the caliper for movement into engagement with the disk which produces a drag force tending to carry the pad around with the disk and acting in a line hereinafter called the drag line, a rigid backing plate carrying said friction pad, and two only circumferentially spaced abutments carried by the backing plate, two abutments secured to the caliper and opposed to and slidably engaged at all times by the respective abutments of the backing plate, each of said abutments secured to the caliper receiving from its engaging abutment a proportionate part of the total drag force when said pad member is engaged with said disk, all of said abutments being spaced radially from and located on one side only of said drag line, at least one of said abutments secured to the caliper being inclined with respect to the drag line so that the reaction force from the abutment intersects the drag line in a direction which is inclined with respect to the drag line.

References Cited

UNITED STATES PATENTS 3,110,365 11/1963 Butler _____ 188—73
3,132,724 5/1964 Ansteth _____ 188—73

FOREIGN PATENTS 1,239,953 7/1960 France.

MILTON BUCHLER, Primary Examiner.

G. E. A. HALVOSA, Assistant Examiner.